United States Patent [19]

Nyqvist

[11] Patent Number: 5,677,620
[45] Date of Patent: Oct. 14, 1997

[54] METHOD AND APPARATUS FOR REMOVING AN ERROR SIGNAL COMPONENT FROM AN RSSI SIGNAL

[75] Inventor: Jouni Nyqvist, Muurla, Finland

[73] Assignee: Nokia Mobile Phones Ltd., Salo, Finland

[21] Appl. No.: 942,941

[22] Filed: Sep. 10, 1992

[30] Foreign Application Priority Data

Sep. 12, 1991 [FI] Finland .................. 914301

[51] Int. Cl.$^6$ ........................... G05F 3/26
[52] U.S. Cl. ........................... 323/315
[58] Field of Search ............... 323/315, 313, 323/316

[56] References Cited

U.S. PATENT DOCUMENTS

| | | | |
|---|---|---|---|
| 4,061,962 | 12/1977 | Stewart | 323/22 R |
| 4,125,789 | 11/1978 | Van Schoiack | 307/296 |
| 4,140,878 | 2/1979 | Ohsawa | 179/15 BT |
| 4,247,949 | 1/1981 | Watanabe | 455/154 |
| 4,278,946 | 7/1981 | Kaplan | 330/288 |
| 4,716,358 | 12/1987 | Fucito | 323/316 |
| 4,868,885 | 9/1989 | Perry | 455/10 |
| 4,890,332 | 12/1989 | Takahashi | 455/67 |
| 4,928,059 | 5/1990 | Franklin et al. | 324/123 |
| 4,992,756 | 2/1991 | Anderson | 330/253 |
| 5,008,609 | 4/1991 | Fukiage | 323/313 |
| 5,010,583 | 4/1991 | Parken | 455/9 |
| 5,027,016 | 6/1991 | Hanna et al. | 307/542 |
| 5,030,903 | 7/1991 | Bernard et al. | 323/313 |

FOREIGN PATENT DOCUMENTS

| | | |
|---|---|---|
| 0 181 017 A1 | 5/1986 | European Pat. Off. . |
| 914301 | 4/1992 | Finland . |
| 24 46 103 | 4/1975 | Germany . |
| 32 13 838 A1 | 10/1983 | Germany . |

OTHER PUBLICATIONS

IBM Technical Disclosure Bulletin vol. 26, No. 3B Aug. 1983 "Beta–Compensated Current Mirror Circuit" D.D. Myro and R. Pelc.

*Primary Examiner*—Adolf Berhane
*Attorney, Agent, or Firm*—Perman & Green, LLP

[57] ABSTRACT

A scaling circuit in which a signal, which contains an ambient offset portion and a desired signal portion, in current mode, is scaled using a resistance means. The offset portion is substantially eliminated using constant flow rate means in the form of a current mirror, thus enabling the entire scaling dynamic of the circuit to be utilized. The teaching of the invention is directed in particular to the elimination of an error signal component from a Received Signal Strength Indicator (RSSI) signal that is output from a radio frequency receiver, such as a radiotelephone receiver.

7 Claims, 3 Drawing Sheets

METHOD AND APPARATUS FOR REMOVING AN ERROR SIGNAL COMPONENT FROM AN RSSI SIGNAL

The present invention relates to improvements in a scaling circuit for use in the production of an output signal characteristic of an input signal, there being a scaling factor between the input and output signals. In particular, the present invention relates to cellular radio telephone communications systems wherein the output signal is a received signal strength indicator (RSSI) indicative of a signal received in an intermediate frequency (IF) circuit.

BACKGROUND OF THE INVENTION

In conventional scaling circuits the output signal, which is normally in current mode, is scaled via a resistor such that, as the magnitude of the resistor used increases, the magnitude of the scaling factor produced increases. However, with such a system the output signal generally includes an offset portion, which is present as a function of the circuit and is independent of the magnitude of the signal. Therefore, if the magnitude of the resistor is large the offset signal will be large and if the magnitude of the resistor is small the offset signal will be small, but the scaling factor will also be small. Therefore due to the offset signal it is not possible with conventional scaling circuits to utilize the full scaling dynamic of the circuit.

One external resistance has so far been generally employed in the output of RSSI signal circuits, and the range of the output voltage provided by the circuit for and IF circuit has been narrow.

In radio telephones the RSSI output voltage is converted by an A/D converter for further processing by the processor. If the range of the RSSI output voltage is narrow and the A/D converter comprises a small number of bits, the resolution of the level indication remains poor after the A/D convertion.

The A/D converters generally use 8 bits and the reading range of the converter is 0 to 5 volts. In radio telephones the output current of the RSSI signals of IF circuits typically range between offset currents of about 5 to 15 microamps and the maximum output current is about 50 to 80 microamps. The maximum voltage level of the output can be about 2 to 4 volts depending on the internal adjustment.

SUMMARY OF THE INVENTION

According to the present invention there is provided a scaling circuit including means for receiving a signal, and means for providing an output signal indicative of the input signal, wherein the output signal may include an offset component characterized by adjustment means coupled to the signal output means for providing a substantially constant signal level independent of the output signal whereby the offset component is substantially eliminated.

In one embodiment the output signal is in voltage mode and the adjustment means provides a substantially constant voltage drop predetermined to substantially eliminate the offset component.

In another embodiment the output is in current mode and the adjustment means are coupled to the signal output means for maintaining a substantially constant predetermined current flow to substantially eliminate the offset component.

An advantage of the present invention is that by eliminating the offset portion of the RSSI output signal regardless of the magnitude of the scaling resistor used it enables a large scaling resistor to be used, thus utilizing the entire scaling dynamic of the RSSI circuit.

BRIEF DESCRIPTION OF THE DRAWINGS

An embodiment of the present invention will now be described, by way of example, with reference to the accompanying drawings in which.

DETAILED DESCRIPTION OF THE INVENTION

Figure 1:
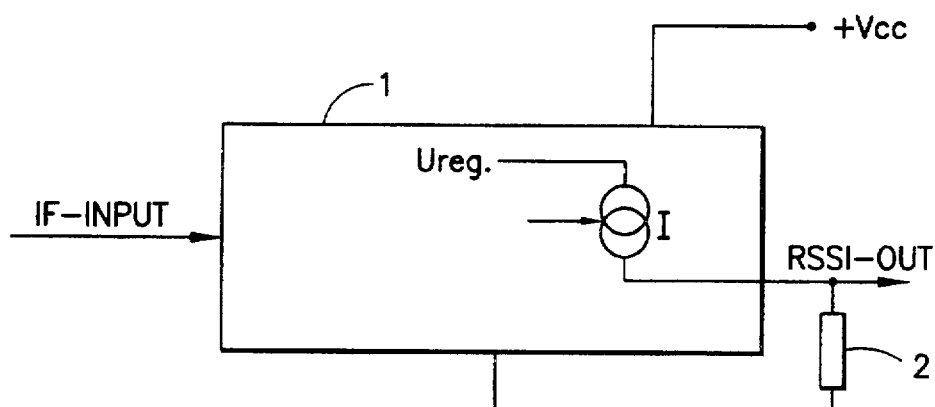
FIG. 1 is a conventional scaling circuit.
Figure 2:
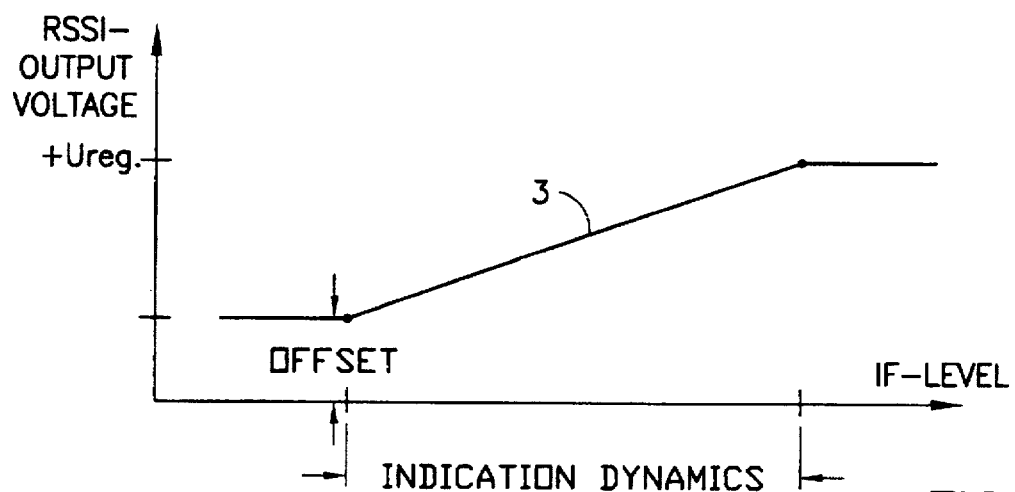
FIG. 2 is a graphical illustration of the scaling factor of the circuit of FIG. 1, for a range of input values, when a large magnitude scaling resistor is used.
Figure 3:
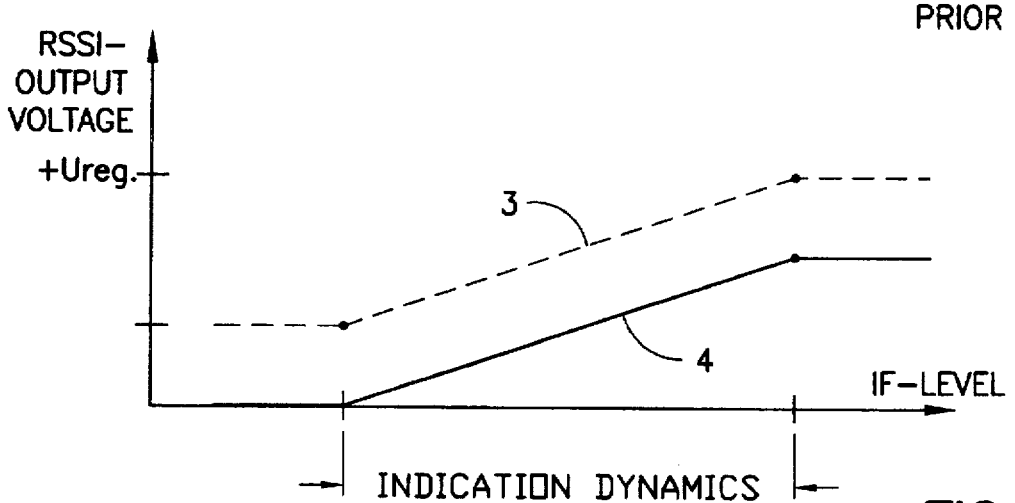
FIG. 3 is a graphical illustration of the scaling factor of the circuit of FIG. 1, for a range of input values when a small magnitude scaling resistor is used.

FIGS. 1 to 3 illustrate how an RSSI output signal can be scaled by a conventional scaling circuit into a desired signal (current/voltage transformer; $V=R*I$) by resistance means 2. The output voltage thus obtained is a linear function of the logarithmic level variation of the IF input signal.

Generally the current output always includes a small offset current causing an offset portion in the output voltage. If external resistance 2 is high, the offset voltage thus formed is also high. Thus a high input level of an IF-input signal respectively gives a high RSSI output voltage. This is generally limited in its maximum to the internal supply voltage of the circuit. FIG. 2 represents the RSSI output voltage 3 as a function of the IF-signal when the external resistance 2 is high.

If the external scaling resistance 2 is low, the offset voltage thus formed is also very low and the available maximum RSSI output voltage remains lower than that when a high resistance is used. FIG. 3 represents RSSI output voltage 4 as a function of the IF-signal when the external resistance is low. The dashed line 3 represents the RSSI output voltage when the external resistance is high.

Figure 4:
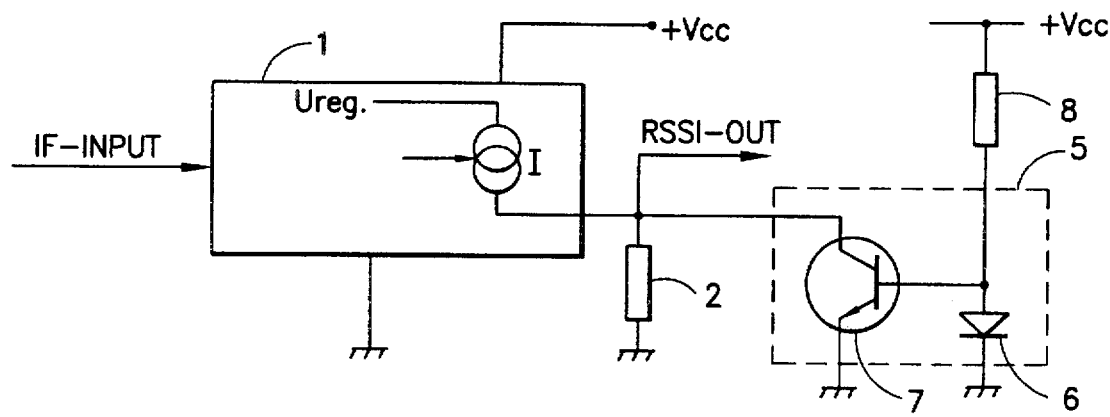
FIG. 4 is a scaling circuit in accordance with the present invention.

FIG. 4 illustrates a scaling circuit wherein the offset portion of the RSSI signal is substantially eliminated and a sufficiently large scaling resistor 2 can be utilized to facilitate use of the full scaling dynamic of the circuit. The circuit includes a means of draining the current corresponding to the offset portion of the signal. Said means is in the form of a current mirror 5.

The current mirror 5 is a circuit construction wherein a current generator can be guided by a reference current. The ratios of the reference current and the output current can be modified. The most simple construction of the current mirror consists of a diode 6 and a transistor 7.

Current mirror 5 serves as a constant flow rate generator.

The current mirror 5 is available integrated in the same casing (for example Philips BCV-61, casing SOT-142). Because the diode 6 and the transistor 7 are both integrated in the same microcircuit, they provide good thermal connection and thus fluctuations in temperature do not change the current ratios of the current mirror 5. The open end of the current mirror 5 is coupled to the RSSI output and the reference current side of the current mirror 5 is connected to the supply voltage +Vcc via resistance 8. The value of resistance 8 is so chosen that the current mirror 5 eliminates the offset current of the RSSI output. The value of resistance 2 is so chosen that the maximum current of the RSSI level indicator provides the highest available output voltage which, according to the above description, is determined in accordance with internal voltage +Vreg of the circuit.

Figure 5:
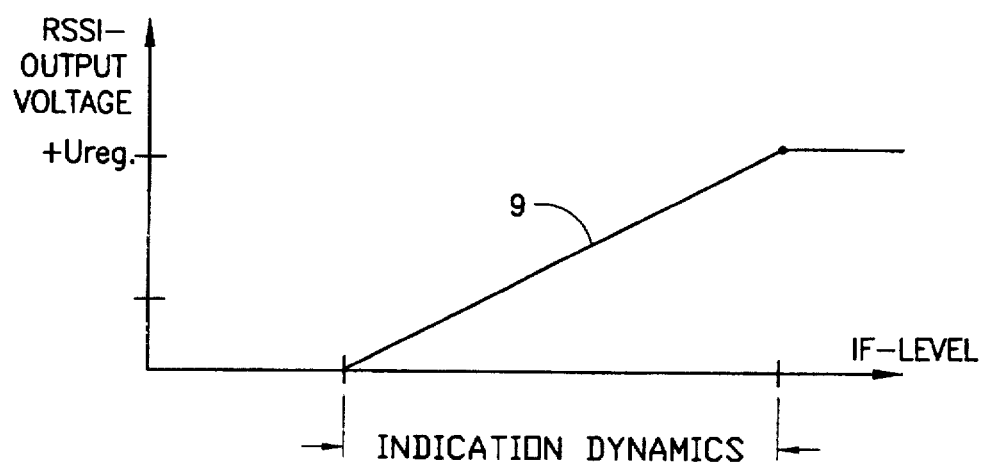
FIG. 5 is a graphical circuit of the scaling factor of the circuit of FIG. 4 for a range of input values.

FIG. 5 represents the RSSI output voltage 9 produced by the circuit in FIG. 4 as a function of the IF signal input. The output voltage 9 has been optimised by the elimination of the offset portion of the RSSI signal and the choice of an optimum magnitude resistor 2 so as to utilize the whole of the scaling dynamic of the circuit, from a voltage of substantially zero to Vreg.

Figure 6:
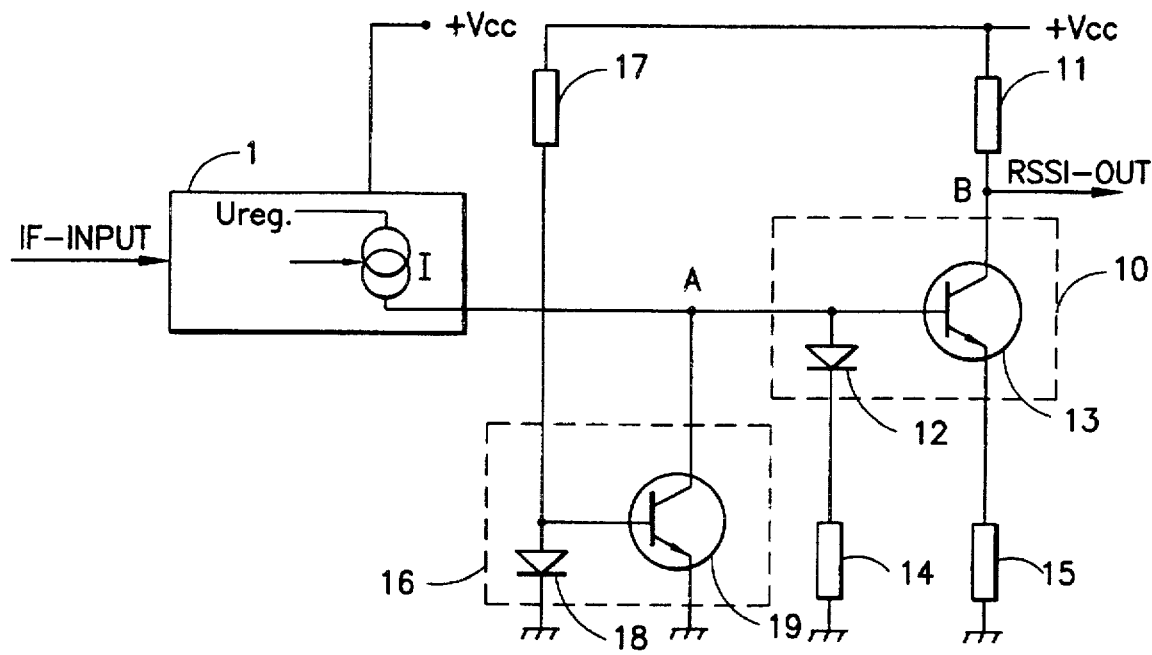
FIG. 6 is a modified scaling circuit in accordance with the present invention.

FIG. 6 represents an embodiment of the present invention suitable for use with IF circuits with a low supply voltage. Output A of the RSSI level indication of IF circuit 1 is coupled to the reference current side of current mirror 10 and its open side is coupled to the supply voltage +Vcc by resistance 11. Current mirror 10 consists of diode 12 and transistor 13.

In addition, current mirror 10 is coupled to the ground potential by two compensating resistances 14 an 15, which can be used to change the ratios of the output current and the reference current. When current scaling is not needed and the matching of current mirror 10 to the circuit is in order, the matching resistances 14 an 15 can be omitted.

Open output B of current mirror 10 provides the RSSI output voltage. The effect of the offset current of the output can be attenuated by second current mirror 16 by coupling its open end to output A and the reference current side to supply voltage +Vcc via resistance 17. Current mirror 16 consists of diode 18 and transistor 19. The value of resistance 17 is so chosen that current mirror 16 eliminates the offset current of the RSSI output. Thus the maximum output signal strength is Vcc instead of Vreg.

Figure 7:
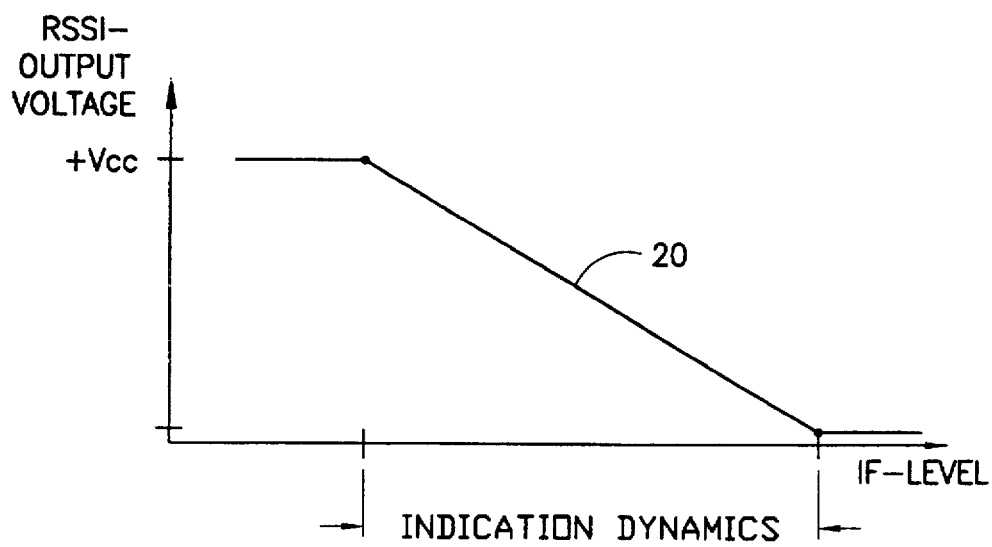
FIG. 7 is a graphical illustration of the scaling factor of the circuit of FIG. 6 for a range of input values.

FIG. 7 represents RSSI output voltage 20 as a function of the IF signal on the IF circuits for the circuit of FIG. 6 in which the level indication function is reversed, i.e., low input levels of the IF signal provide a high output voltage and high levels provide a low output voltage. With the aid of the circuit, the whole usable dynamics of the RSSI level indicator and the desired voltage range of the output can be utilized in this IF circuit, despite the low internal voltage Vreg.

This application is very useful in IF circuits with a low supply voltage, such as +3V or under.

In addition, the resolution after the A/D convertion used in radio telephones is also essentially better with the aid of the invention.

In view of the foregoing description it will be evident to a person skilled in the art that modifications may be incorporated without departing from the scope of the present invention.

I claim:

1. A Received Signal Strength Indicator (RSSI) generation circuit for use in a radiotelephone receiver, comprising:

an intermediate frequency (IF) stage for processing a received radio frequency signal, said IF state having an output for outputting a current having a magnitude that is a function of a received signal strength, said current including an offset current component;

first circuit means having an input coupled to said output of said IF stage for converting said current to a voltage having a magnitude that is a function of the received signal strength, said first circuit means having an output for outputting the voltage; and second circuit means coupled to said output of said IF stage for substantially eliminating the offset current component such that the magnitude of the voltage is a function of only the received signal strength.

2. A RSSI generation circuit as set forth in claim 1 wherein said first circuit means is comprised of current/voltage transform means and wherein said second circuit means is comprised of at least one current mirror, said at least one current mirror including:

transistor means having a collector terminal coupled to said output of said IF stage and to said current/voltage transform means, an emitter terminal coupled to a reference potential, and a base terminal; and diode means having an anode terminal coupled to said base terminal and, through a current limiting means, to a voltage potential, said diode means further having a cathode terminal coupled to the reference potential, wherein said current limiting means is selected to provide a current flow through said diode means for causing a current that is substantially equal to said offset current component to flow through said collector terminal of said transistor means.

3. A RSSI generation circuit as set forth in claim 1 wherein said second circuit means is comprised of:

a first current mirror including,
first transistor means having a collector terminal coupled to said output of said IF stage, an emitter terminal coupled to a reference potential, and a base terminal; and
first diode means having an anode terminal coupled to said base terminal and, through a current limiting means, to a voltage potential, said first diode means further having a cathode terminal coupled to the reference potential, wherein said current limiting means is selected to provide a current flow through said first diode means for causing a current that is substantially equal to said offset current component to flow through said collector terminal of said first transistor means;

and wherein said first circuit means is comprised of,
a second current mirror including,
second transistor means having a collector terminal coupled to the voltage potential through an output resistance, an emitter terminal coupled to a reference potential, and a base terminal; and
second diode means having an anode terminal coupled to said base terminal of said second transistor means, to said collector terminal of said first transistor means, and to said output of said IF stage, said second diode means further having a cathode terminal coupled to the reference potential.

4. A RSSI generation circuit as set forth in claim 3 and further comprising:

a first resistance coupled between said emitter terminal of said second transistor means and the reference potential; and a second resistance coupled between said cathode terminal of said second diode means and the reference potential; wherein values of said first and second resistances are selected to obtain a scaling between the current output from said IF stage and a current flowing through said first circuit means.

5. A RSSI generation circuit as set forth in claim 2 wherein said current/voltage transform means is comprised of a first resistance that is coupled between said collector terminal and the reference potential; and wherein said current limiting means is comprised of a second resistance that is coupled between said anode and the voltage potential.

6. A method for generating a Received Signal Strength Indicator (RSSI) for use in a radiotelephone receiver, comprising the steps of:

operating an Intermediate Frequency (IF) state for outputting a current having a magnitude that is a function of a received signal strength, the current including an undesired current component;

converting the current to a voltage having a magnitude that is a function of the received signal strength; and substantially eliminating the undesired current component such that the magnitude of the voltage is a function of only the received signal strength.

7. A method as set forth in claim 1 wherein the step of substantially eliminating includes a step of operating at least one current mirror to provide a current that is substantially equal in magnitude and opposite in polarity to the undesired current component for cancelling the undesired current component.

\* \* \* \* \*